June 27, 1950

J. E. WEIKS 2,513,124

MARINE ENGINE COOLER

Filed May 28, 1945

INVENTOR.
John E. Weiks
BY Fred C. Matheny
ATTORNEY

June 27, 1950  J. E. WEIKS  2,513,124
MARINE ENGINE COOLER

Filed May 28, 1945  2 Sheets-Sheet 2

INVENTOR.
John E. Weiks
BY
Fred C. Matheny
ATTORNEY

Patented June 27, 1950

2,513,124

UNITED STATES PATENT OFFICE 2,513,124

MARINE ENGINE COOLER

John E. Weiks, Seattle, Wash.

Application May 28, 1945, Serial No. 596,273

2 Claims. (Cl. 257—236)

This invention relates to a marine engine cooler.

An object of this invention is to provide a marine engine cooler of a type in which fresh water is used in the engine jacket for cooling purposes and sea water is used in the cooler to cool the fresh water.

Another object is to provide a tubular type marine engine cooler of novel and efficient construction that is not expensive to manufacture and that is comparatively easy to install in connection with marine engines now in common use.

Another object is to provide a marine engine cooler that is very compact in construction that is particularly well adapted to be installed within small boats rather than on the exterior thereof and that is arranged so that all parts are readily accessible for installation servicing and repair.

Another object is to provide a marine engine cooler which will maintain a marine engine at a constant temperature best calculated for efficient operation and fuel economy irrespective of variations in the operating speed of said engine.

Another object is to provide efficient means for mimimizing damage, due to galvanic action, in a marine engine cooler through which sea water is circulated.

Another object is to provide efficient baffle plate means for distributing a flow of fresh water around the exterior of a plurality of tubes that are cooled by circulating sea water therethrough so that the fresh water is properly distributed as respects the tubes and is caused to travel at an even velocity along the tubes thus insuring a high cooling efficiency.

Other objects of the invention will be apparent from the following description taken in connection with the accompanying drawings.

In the drawings.

Like reference numerals designate like parts throughout the several views.

Figure 1:
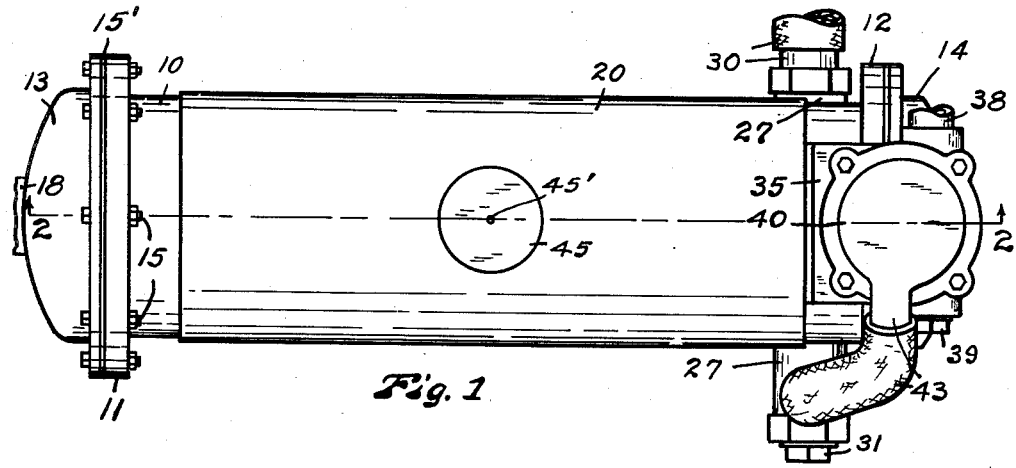
Fig. 1 is a top plan view of a marine engine cooler constructed in accordance with this invention.
Figure 2:
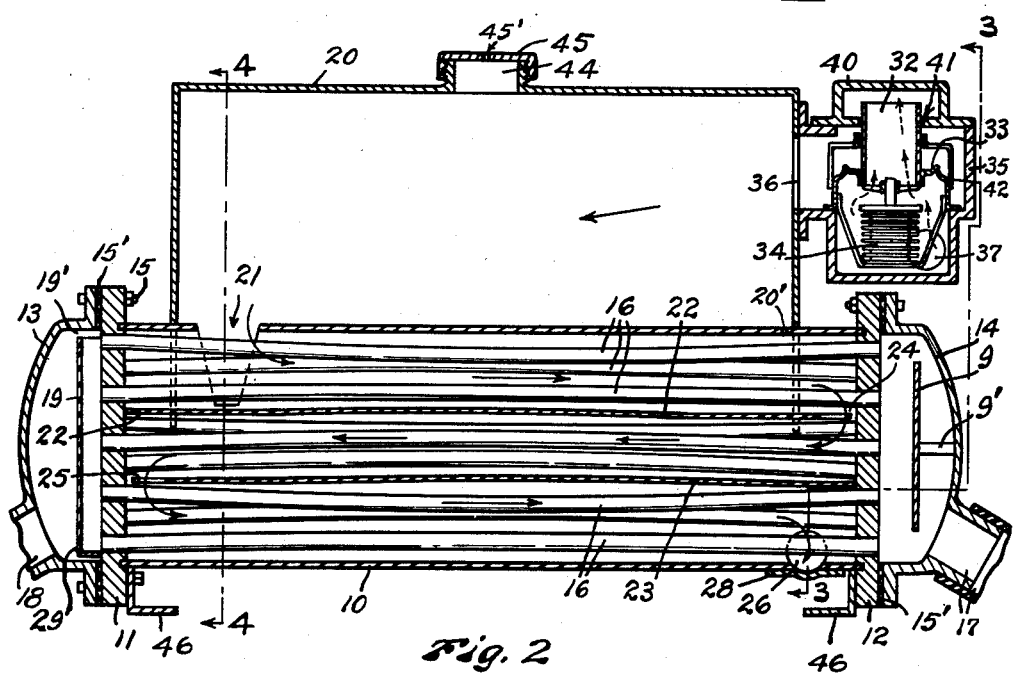
Fig. 2 is a longitudinal sectional view of said cooler taken substantially on broken line 2—2 of Fig. 1.

This cooler comprises an outer cylindrical shell 10 having two tube sheets 11 and 12 fixedly connected with opposite ends thereof, as shown in Fig. 2. Two bowl shaped end manifolds 13 and 14 are secured to the respective tube sheets 11 and 12 at the two ends of the cooler, preferably by bolts 15. A gasket 15' is preferably provided between each manifold and the adjacent tube sheet.

A plurality of tubes 16 extend lengthwise within the shell 10 and have their respective ends secured in the tube sheets. The connections between the end portions of the tubes 16 and the tube sheets 11 and 12 are all watertight. One preferred way of providing these watertight connections is to expand the tubes 16 in the tube sheets 11 and 12. Another way is to form these connections between the tubes and tube sheets by soldering, as with silver solder. When these tubes are fixedly connected to the tube sheets it is necessary to design the cooler so as to compensate for unequal expansion and contraction. This is preferably done by bowing or curving the tubes or making them slightly crooked, as shown in Fig. 2. When the tubes are thus slightly bowed they will have enough longitudinal elasticity to compensate for the slight inequalities in expansion and contraction to which they are subjected without danger of breaking the seals between these tubes and the tube sheets.

While I have shown the tubes as curved in different directions I find that these tubes can be drained more easily, in the event it is necessary to drain the same, if all of said tubes are bowed upwardly. The baffle plates 22 and 23 are also preferably curved.

Preferably a galvanic retarder in the form of a plate 9 of zinc or black iron is provided in at least one of the manifolds such as manifold 14. This plate 9 may be secured as by one or more bolts 9' to the manifold 14. Under the galvanic action of sea water this plate will be subjected to galvanic action and the galvanic action in other parts of the cooler will thereby be reduced.

The tubes 16 form conduits through which fluid, such as sea water, can pass from one manifold to another. Preferably a sea water inlet conduit 17 is connected with the manifold 14 and a sea water outlet conduit 18 is connected with the manifold 13.

A flood plate 19 is provided in the manifold 13 at the sea water discharge end of the tubes 16 to maintain a high level of sea water and keep substantially all of these tubes full of sea water at all times. This flood plate 19 is preferably secured to the adjacent tube sheet 11, is spaced from said tube sheet 11 and is cut away at the top to leave an overflow opening 19' through which all sea water that leaves the tubes 16 must pass.

The fresh water by which the engine is cooled circulates in the shell 10 around the tubes 16.

It is sometimes desirable to be able to angularly adjust the manifold 13 to facilitate connecting conduits therewith. By securing the flood plate 19 to the tube sheet 11 I make it possible to angularly adjust the manifold 13 without disturbing the position of the flood plate 19.

A fresh water receptacle 20 is mounted on the shell 10 and communicatively connected therewith as hereinafter explained. The fresh water receptacle 20 herein disclosed is of inverted U-shape in cross section, is slightly shorter in length than the shell 10, and may have its edge portions brazed or welded or soldered to the shell 10. The fresh water receptacle 20 communicates with the shell 10 by means of a slot 21 provided in the wall of the shell 10 near the sea water discharge manifold 13. The slot 21 is relatively long and extends approximately throughout the upper one-third of the circumference of the shell 10. Preferably this slot 21 is narrower at its two ends and is wider mid way of its length so as to distribute the fresh water in the correct proportion to the exposed tube area in the upper compartment of the shell 10. Thus more fresh water is admitted to the medial portion of this upper compartment and less toward the edges as there are more tubes in the medial portion of this compartment than there are toward the edges.

The shell 10 is provided with two longitudinally extending horizontal baffle plates 22 and 23 that are positioned between groups of the tubes 16 and divide the shell into three compartments positioned one above another.

Figure 5:
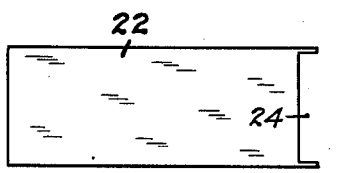
Figs. 5 and 6 are two detached plan views on a reduced scale of two deflector plates used in the cooler shown in Figs. 1 to 4.
Figure 6:
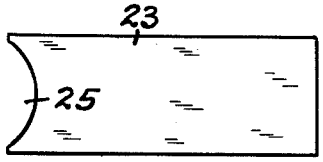

The end of the upper baffle plate 22, that is shown at the left in Fig. 2, is positioned closely against the tube sheet 11. The other end of said baffle plate 22, see Fig. 5, is spaced from the tube sheet 12 to provide an opening 24 between the end of said baffle plate 22 and the tube sheet 12, shown at the right in Fig. 2. The lower baffle plate 23 has the end thereof that is shown at the right, Figs. 2 and 6, positioned closely against the tube sheet 12. The other end of said baffle plate 23 is concavely recessed, see Fig. 6, to leave an opening 25 adjacent the tube sheet 11 at the left, Fig. 2.

The configuration of the ends of the baffle plates 22 and 23 by which the openings 24 and 25 are provided is such as to distribute the fresh water substantially evenly to the tubes of the compartment this water is entering. Thus fresh water entering the medial compartment below baffle plate 22 will tend to flow evenly around the end of said plate 22 shown at the right, while the shape of the end of plate 23 shown at the left will permit the flow of a larger volume of fresh water at the center and a lesser volume toward the edges and yet maintain a substantially constant velocity or rate of travel of the fresh water in all parts of the shell 10. This regulation of the flow of fresh water by the shape of the slot 21 and the shape of the two openings 24 and 25 is important as it tends to keep the velocity of the fresh water in all parts of the shell 20 substantially constant, helps to provide an even cooling of the water, and increases the general efficiency of the cooler.

The fresh water entering the shell 10 through the slot 21 flows to the right, Fig. 2, throughout the length of the upper fresh water compartment, thence down through opening 24, thence to the left, Fig. 2, throughout the length of the medial fresh water compartment, thence down through opening 25, thence to the right, Fig. 2, throughout the length of the lower compartment and thence out of the shell 10 through an opening 26.

It will be noted that the direction of flow of the fresh water in both the upper compartment and the lower compartment is counter to the direction of flow of the sea water through the tubes 16 and this helps to make the cooler highly efficient.

A filler opening 44 arranged to be closed by a cap 45 is preferably provided in the upper portion of the fresh water receptacle 20. Cap 45 has a pressure relief vent 45' to the atmosphere.

The conduit means that receives the fresh water as it discharges from the opening 26 is preferably a transverse pipe 27. The pipe 27 is connected with the shell 10 by a saddle member 28 that is welded or brazed or soldered to both the pipe 27 and the shell 10. The pipe 27 has an opening that registers with the fresh water outlet opening 26. The pipe 27 is positioned crosswise of the shell 10 and is arranged so that either end of said pipe 27 may be connected with a conduit 30 that leads to a motor to be cooled.

The nature of the installation will determine which end of the pipe 27 will be connected with the fresh water conduit 30 and the other end of said pipe 27 will be closed as by a plug 31.

To prevent trapping air in the end portion of the shell shown at the right in Fig. 2, I preferably provide, at this end, an air vent 20'' of very small diameter in the wall of the shell 10 leading into the fresh water receptacle 20.

A small drainage vent 29 is preferably provided in the bottom portion of the flood plate 19 to assist in the drainage of sea water.

Bracket members 46 are secured to the marginal portions of the tube sheets 11 and 12, preferably by cap screws 47 that screw into threaded holes 48. Several sets of the holes 48 are provided so that these mounting brackets 46 can be adjusted around the cooler to various positions as may be advantageously in different installations.

To provide for quickly heating the fresh water when a cold motor is first started I preferably employ a conventional thermostatic control unit comprising a valve member 32—33 movable by a temperature responsive member 34 of bellows type.

This thermostatic control unit is disposed in a housing 35 that is secured to an end of the fresh water receptacle 20. The housing 35 communicates with the interior of the fresh water receptacle 20 by a passageway 36. A fresh water inlet opening 37 in the lower portion of the housing 35 is connected by conduit means 38 with a motor to be cooled whereby water from jacket spaces of a motor may enter the housing 35.

Figure 3:
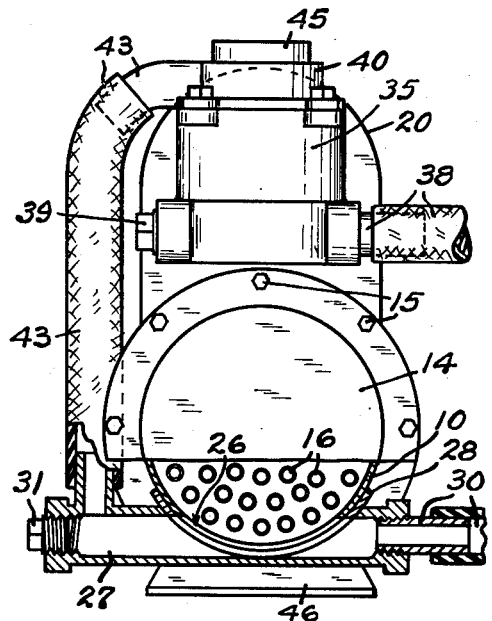
Fig. 3 is a view partly in end elevation and partly in cross section taken substantially on broken line 3—3 of Fig. 2.
Figure 4:
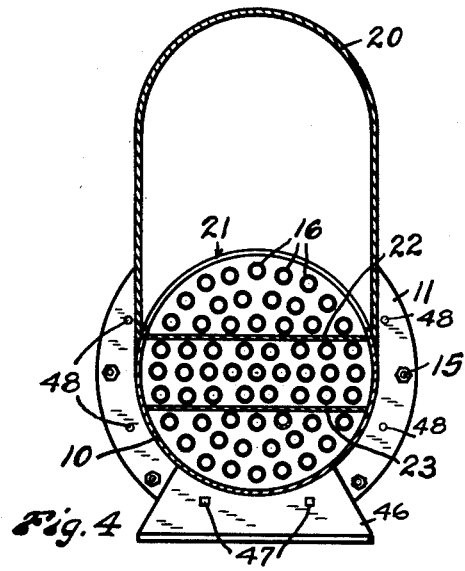
Fig. 4 is a sectional view taken substantially on broken line 4—4 of Fig. 2.

Preferably a duplicate of the opening 37 is provided on the opposite side of the housing 35 for convenience in making connection with conduit means 38. This duplicate of opening 37 is shown as closed by a plug 39, see Fig. 3.

A cap 40 is provided on the housing 35 and a cylindrical passageway 41 in this cap telescopically receives the tubular element 32 of the thermostat valve. The other valve element 33 of the thermostat valve is arranged to rest on a seat 42 when the member 34 is cold. The cap 40 is connected by conduit means 43 with the fresh water outlet pipe 27.

In starting a cold motor the water will be cold and this cold water entering through the opening 37 will pass upwardly around the thermostat 34 thence through tubular valve member 32 into cap 40, see broken line arrows Fig. 2, and will thence by-pass the cooler and flow through conduits 43, 27 and 30 back to the motor. While the cold water is thus by-passing the cooler the valve 33 will be held closed on seat 42 by the cold thermostat 34. As soon as the water begins to heat up the thermostat 34 will begin to expand. This will begin to open the valve 33 and, at the same time, will begin to close the opening between the top of the tubular valve member 32 and the top wall of the cap 40. This valve action will continue until the fresh water has become heated to a predetermined normal operating temperature. By the time this normal operating temperature is reached the valve 33 will be fully open and the tubular valve 32 will be firmly closed aganst the top wall of the cap 40. The fresh water will then follow a course through the cooler as indicated by the arrows in full lines in Fig. 2.

The thermostat will thus operate in the manner above described to keep the motor always at the temperature best suited to efficient operation irrespective of the speed of the motor.

Figure 7:
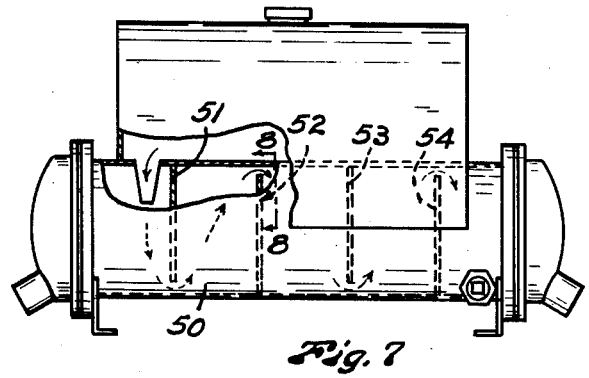
Fig. 7 is a somewhat diagrammatic view in side elevation with parts broken away showing a cooler having baffle plate means of modified form, the tubes being omitted.
Figure 8:
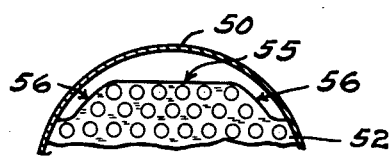
Fig. 8 is a fragmentary sectional view on a larger scale than Fig. 7 and taken substantially on broken line 8—8 of Fig. 7 illustrating said modified baffle plate means, the tubes being omitted.

Figs. 7 and 8 show a modification of the invention in which upright baffle members are used in place of the horizontal baffle members to provide an evenly distributed flow of water in a circuitous path in a shell 50 that is similar to the shell 10. Fig. 7 shows four upright baffle plates or members 51, 52, 53 and 54 in the shell 50 but obviously any desired number of said baffle plates may be used. These baffle plates 51 to 54 may be of duplicate construction but are alternately reversed in position in the shell 50 so that the water will be deflected from side to side of the shell 50 as it progresses from one end to the other of this shell.

The side of each baffle plate 51 to 54 that the water passes around is preferably shaped as shown in Fig. 8 so that an even velocity will be maintained and the water will be distributed substantially evenly to the tubes in the compartment toward which it is moving. Thus Fig. 8 shows the top portion of the plate 52 cut away along a straight line 55 across the medial portion of the plate and along inclined lines 56 toward the edges of the plate. This allows more water to flow over the central portion of the plate 52 and passes a uniformly diminishing amount of water toward the sides of the plate where the tube area in the shell 50 is less than it is in the central portion of said shell.

The tubes are not shown in Figs. 7 and 8 but when upright baffle plates such as 51 to 54 are used these tubes will necessarily pass through the baffle plates. Under these circumstances it is not possible to use the curved or crooked tubes and provision is made at the location where the tubes connect with the tube sheets for taking care of expansion and contraction of the tubes.

In the installation of this marine engine cooler the cooler is always placed in a substantially upright position as shown in Figs. 1 to 4, 7 and 8.

In the operation of this marine engine cooler sea water is pumped, by any suitable means, through the tubes of the cooler and, at the same time, warm fresh water from the engine jacket is circulated through the shell 10 around the tubes. Thus the operating temperature of the motor is very accurately regulated and at the same time the motor is protected from the direct action of the sea water.

The foregoing description and accompanying drawings clearly disclose a preferred embodiment of my invention but it will be understood that changes in the invention may be made within the scope and spirit of the following claims.

I claim:

1. In a marine engine cooler, a horizontally disposed cylindrical shell; tube sheets at the ends of said shell cooperating therewith to form a housing; substantially evenly distributed tubes extending through said housing and having end portions connected with said tube sheets, whereby said tubes communicate with the space outside of said tube sheets; means adapted to pass liquid for cooling purposes through said tubes; means adapted to pass liquid to be cooled through said housing external to said tubes; and two longitudinally extending substantially parallel baffle plates disposed in said housing on opposite sides of the axis thereof dividing said housing into a medial compartment of uniform width between said baffle plates and two compartments of segmental cross sectional shape between the respective baffle plates and the housing wall, two alternate ends of the respective baffle plates being positioned in water obstructing proximity to the respective tube sheets, the other two ends of the respective baffle plates being spaced from the respective tube sheets providing flow passageways, the end of the baffle plate past which water flows into the medial compartment being substantially straight to provide a flow passageway of substantially equal width from side to side of the housing and the end of the baffle plate past which water flows from the medial compartment to one of the segmentally shaped compartments being arcuately and concavely recessed to provide a flow passageway of segmental shape and gradually decreasing area from the center toward the edges, whereby the velocity of the water in all parts of the two compartments will be substantially uniform and a substantially uniform amount of water will contact all of the tubes in said two compartments.

2. In a marine engine cooler, a horizontally disposed cylindrical shell; tube sheets connected with the ends of said shell cooperating therewith to form a housing; substantially evenly distributed tubes extending through said housing and having end portions connected with said tube sheets whereby said tubes communicate with the space outside of said tube sheets; means adapted to pass liquid for cooling purposes through said tubes; two longitudinally extending substantially parallel baffle plates disposed in said housing and spaced apart to divide said cylindrical housing into an upper, a lower and a medial compartment, said upper and lower compartments being of segmental cross sectional shape, said lower compartment having a water outlet opening, and said upper compartment having a transversely positioned slot forming a water inlet opening extending substantially around the cylindrical wall portion of said upper compartment, said slot being convergently tapered from its medial portion toward both ends to cooperate in imparting a substantially constant velocity to water in said upper compartment, two alternate ends of the respective baffle plates being positioned in water obstructing proximity to the respective tube sheets, the other two ends of the respective baffle plates being spaced from the respective tube sheets providing flow passageways, the end of the baffle plate past which water flows into the medial compartment being substantially straight to provide a flow passageway of substantially equal width from side to side of the housing and the end of the baffle plate past which water flows into the lower compartment being arcuately and concavely recessed to provide a flow passageway of segmental shape and of gradually decreasing area from the center toward the edges, whereby the velocity of the water in all parts of all of said compartments will be substantially uniform and a substantially uniform amount of water will be supplied around all of the tubes.

JOHN E. WEIKS.

REFERENCES CITED

The following references are of record in the file of this patent:

UNITED STATES PATENTS

| Number | Name | Date |
|---|---|---|
| 46,368 | Lighthall | Feb. 14, 1805 |
| 1,722,109 | Potter | July 23, 1929 |
| 1,842,945 | Price et al. | Jan. 26, 1932 |
| 2,183,160 | Coulter et al. | Dec. 12, 1939 |
| 2,191,627 | Schutt | Feb. 27, 1940 |
| 2,395,543 | Gallaher | Feb. 26, 1946 |
| 2,397,069 | Young et al. | Mar. 19, 1946 |

FOREIGN PATENTS

| Number | Country | Date |
|---|---|---|
| 22,669 | Great Britain | Oct. 28, 1898 |